Oct. 31, 1933.  G. RAYMOND  1,933,340
OSCILLATOR FOR AUTOMATIC ELECTRIC WELDING HEADS
Filed June 18, 1931   3 Sheets-Sheet 1

INVENTOR.
Gwynne Raymond
BY
ATTORNEY.

Oct. 31, 1933.    G. RAYMOND    1,933,340
OSCILLATOR FOR AUTOMATIC ELECTRIC WELDING HEADS
Filed June 18, 1931    3 Sheets-Sheet 2

INVENTOR.
Gwynne Raymond
BY
ATTORNEY.

Oct. 31, 1933.   G. RAYMOND   1,933,340
OSCILLATOR FOR AUTOMATIC ELECTRIC WELDING HEADS
Filed June 18, 1931   3 Sheets-Sheet 3
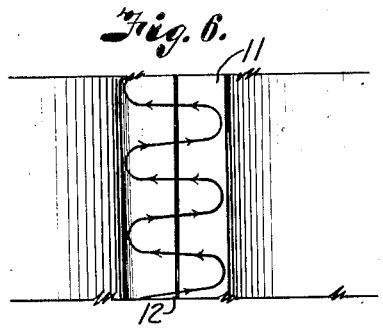
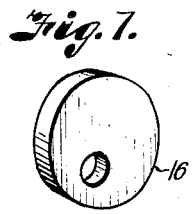
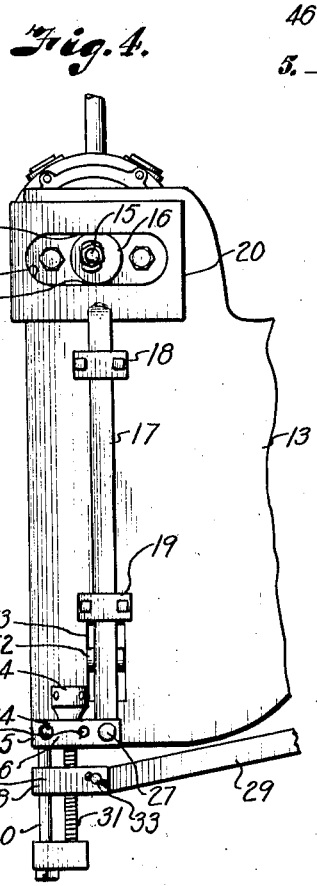
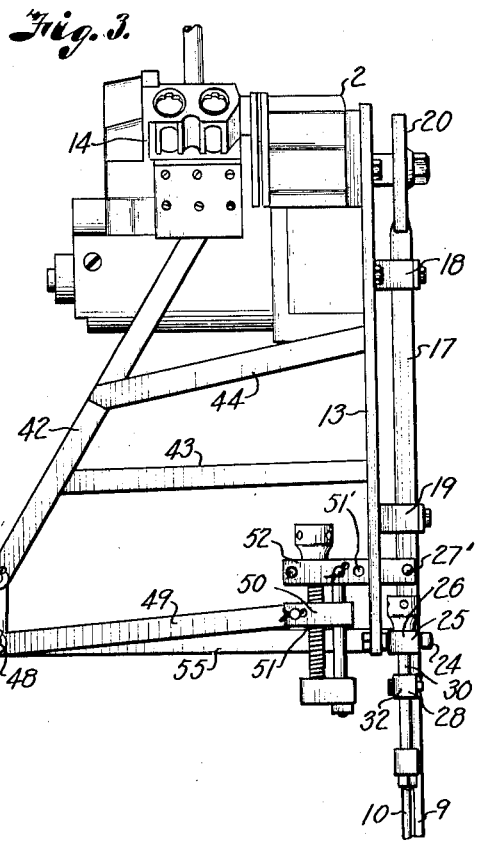
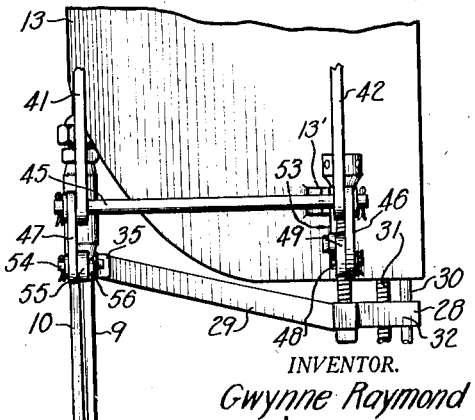
INVENTOR.
Gwynne Raymond
BY
ATTORNEY.

Patented Oct. 31, 1933

1,933,340

UNITED STATES PATENT OFFICE 1,933,340

OSCILLATOR FOR AUTOMATIC ELECTRIC WELDING HEADS

Gwynne Raymond, Kansas City, Mo.

Application June 18, 1931. Serial No. 545,159

13 Claims. (Cl. 219—8)

This invention relates to welding apparatus and particularly to apparatus of that character for electric arc welding of wide or heavy seams such as are employed in the manufacture of high pressure vessels, the principal objects of the invention being to provide controlled transverse oscillation of the welding electrode to cover the width of the seam and to adjust the length and frequency of the oscillations in proportion to the progress of the welding head in automatic welding apparatus.

It is also an object of the invention to effect change of oscillation of the electrode rod from one plane to oscillate in planes at angles to the first plane.

In accomplishing these and other objects of the invention, I have provided improved details of structure, the preferred forms of which are illustrated in the accompanying drawings, wherein:

Fig. 3 is a side elevational view of the oscillating mechanism, particularly illustrating the links and bell crank levers for actuating the electrode holder.

Fig. 4 is a front elevational view illustrating the eccentric mechanism for actuating the bell crank lever to oscillate the electrode holder in one plane.

Fig. 5 is a rear view of a portion of the apparatus illustrating the rock shaft for effecting oscillations of the electrode holder in a plane at right angles to that effected by the bell crank lever in Fig. 4.

Fig. 6 is a plan view of a welded seam illustrating diagrammatically the path of the electrode rod with relation to the seam.

Fig. 7 is a detail perspective view of a cam for operating the reciprocating rod.

Figure 1:
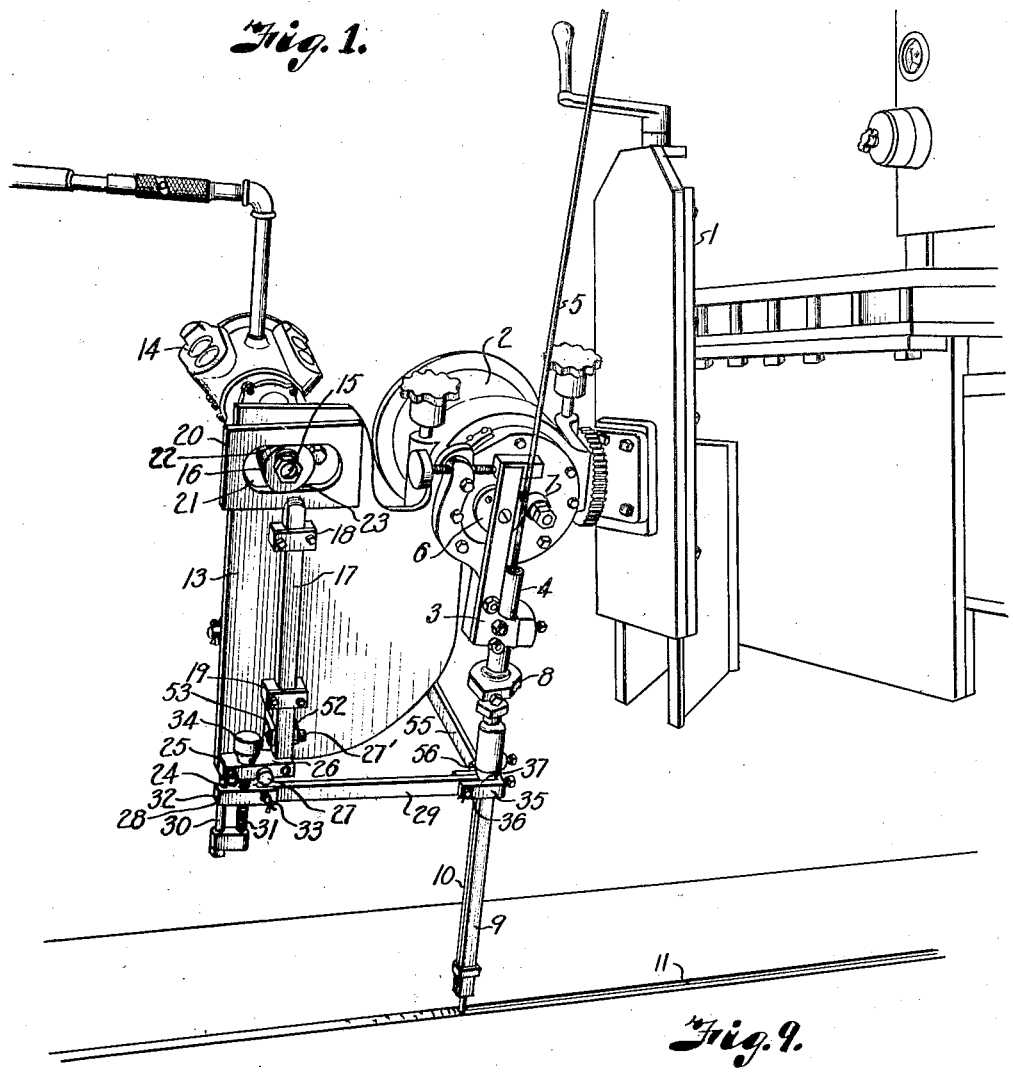
Fig. 1 is a front perspective view of an automatic welding head equipped with an oscillating apparatus constructed in accordance with my invention.

Referring more in detail to the drawings:

1 designates the welding head of an automatic welding machine of conventional type and includes an electrode feeding mechanism indicated by the housing 2 to which is secured a bracket 3 carrying a tubular guide 4 for the electrode 5 which is guided therethrough between a pair of rollers 6 and 7 also carried by the housing, as illustrated in Fig. 1. Connected to the lower end of the tube 4 by a ball and socket joint 8 is a pair of rectangular guide bars 9 and 10 for guiding and supporting the lower end of the wire 5.

The apparatus thus far described is of conventional construction and specifically forms no part of the present invention but is illustrated to show the application of an oscillating mechanism constructed in accordance with my invention.

Figure 10:
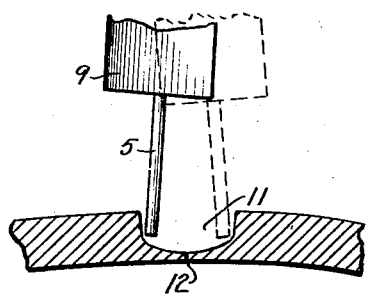
Fig. 10 is a sectional view of a tank joint illustrating movement of the electrode wire to fill in the cleft formed to receive the welding metal.

In arc welding of wide heavy seams with an automatic welding head as illustrated, I find it desirable to oscillate the electrode holder during the welding process to cover the entire width of the seam, which in most instances is greater than can be heated by the present automatically fed electrode. I therefore provide mechanism to effect transverse oscillation of the electrode from one side of the seam to the other at the same time the welding head is moving therealong, and filling the specially constructed groove 11 formed along the edges of the seam 12, as best illustrated in Fig. 10. It is also necessary when welding the roundabout or lateral seams of a tank such as is illustrated, to change the direction of the oscillations from that required in welding the longitudinal seams and I have provided means whereby this change may be quickly made.

The oscillating mechanism includes a vertically positioned plate 13 bolted to and supported by the housing 2 and which extends laterally therefrom in a plane substantially parallel with the electrode holder above described.

Supported on the rear side of the plate is a motor 14 which may be an air motor, as illustrated, or any variable speed type of electric motor for actuating a shaft 15 rotatably mounted in the plate 13.

Fixed on the projecting end of the shaft at the front side of the plate 13 is a cam 16 for effecting reciprocation of a rod 17 that is slidably mounted in spaced bearings 18 and 19 fixed to the front face of the plate.

Carried at the upper end of the rod is an eccentric head 20 having an elongated laterally extending opening 21 forming a cam track for the cam 16. The upper and lower edges 22 and 23 of the cam track preferably snugly engage opposite diametrical points of the cam so that the cam is in constant engagement with the head to impart a continuous reciprocating motion to the rod 17 without the aid of springs or the like to maintain the cam track in continual contact with the cam.

Pivotally mounted on a stud 24 at the lower left hand corner of the plate (Fig. 1), is a bell crank lever 25 having one arm 26 which may be pivotally connected to the depending end of the rod 17 by a removable pin 27, which in Fig. 1 is shown inserted in position to lock the lever as later described. However, when the pin is inserted to connect the rod 17, reciprocation of the rod effects swinging movement of the bell crank lever and arcuate movement of its other arm 28 which is connected by a link 29 with the electrode holder. It is thus obvious that vertical reciprocatory movement of the rod is transformed to lateral reciprocatory movement by the bell crank to oscillate the lower end of the electrode holder to carry the electrode back and forth across a seam.

In order that the extent of movement of the electrode may be adjusted, the arm 28 of the bell crank lever is preferably designed so that pivotal attachment of the connecting link 29 may be shifted to and from the fulcrum 24. The arm 28 of the bell crank lever, therefore, preferably includes a guide rod 30 and a screw shaft 31 extending parallel therewith to mount a block 32 carrying the pivot pin 33 which connects the link 29. The adjusting screw is provided with a knurled head 34 by which the screw may be readily rotated to thread the block therealong for adjusting the position of the pivot pin.

The opposite end of the link 29 is connected with a yoke 35 on the electrode holder by a pivot pin 36 extending through the arms 37 of the yoke and the end of the link, as best illustrated in Fig. 1.

In order that the electrode may be oscillated in a plane at right angles to the oscillations effected by the bell crank 25, I provide for changing direction of the oscillations imparted to the electrode holder as now described.

Depending below the motor 2 are spaced arms 41 and 42 braced from the plate 13 by arms 43 and 44 respectively. Rotatably mounted in the lower ends of the arms 41 and 42 is a rock shaft 45 having depending lever arms 46 and 47 at its opposite ends, the lever arm 46 being positioned in alignment with the rod 17 and the arm 47 in substantial alignment with the electrode holder.

Pivotally connected by a pin 48 with the lower end of the arm 46 is one end of a link 49 having its other end pivotally connected with an adjusting block 50 that is mounted on the depending arm of a bell crank lever 51 of identically the same construction as the bell crank previously described, but which is mounted on a bracket 13' to swing in a plane at right angles to the bell crank 25.

The other arm 52 of the bell crank 51 projects through a slot 53 in the lower end of the plate and is provided with a yoke-shaped end for straddling the sides of the rod 17 which may be at a point above the bell crank lever 25. Since the rod 17 is slidably supported in relation with the plate 13, reciprocation thereof will effect swinging movement of the link 46 to rock the shaft 45 and actuate the lever 47. The lever 47 is pivotally connected by a pin 54 with one end of a link 55 having its opposite end connected between spaced ears 56 projecting from the yoke 35 at right angles to the arms connecting the link 29 so that the electrode is oscillated in a plane at right angles to the oscillations effected by the bell crank lever 25.

When the bell crank 51 is to be operated, however, the bell crank 25 is locked by the pin 27, the pin extending through an opening in the bell crank and into an aligning opening in the plate. A similar pin 27' is then inserted through the bell crank 51 to connect the bar 17, as is shown in Fig. 1. It is thus apparent that the bell crank 25 is freed from the rod 17 which then actuates the bell crank 51.

The pivotal connections for the bell cranks and for the links 29 and 55 may be provided with ball and socket joints or they may be constructed to permit sufficient lateral movement so that it is not necessary to connect or disconnect either of the respective links when the change in direction of oscillation is required.

It is apparent that a circular cam, as illustrated in Fig. 7, may produce substantially a sine curve, and the spacing of the cycles is controlled by the speed of the oscillations in proportion to the forward travel of the electrode.

Figure 9:
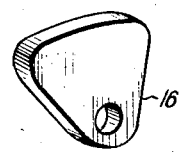
Fig. 9 is a perspective view of the cam for effecting oscillation of the electrode holder as illustrated in Fig. 8.
Figure 2:
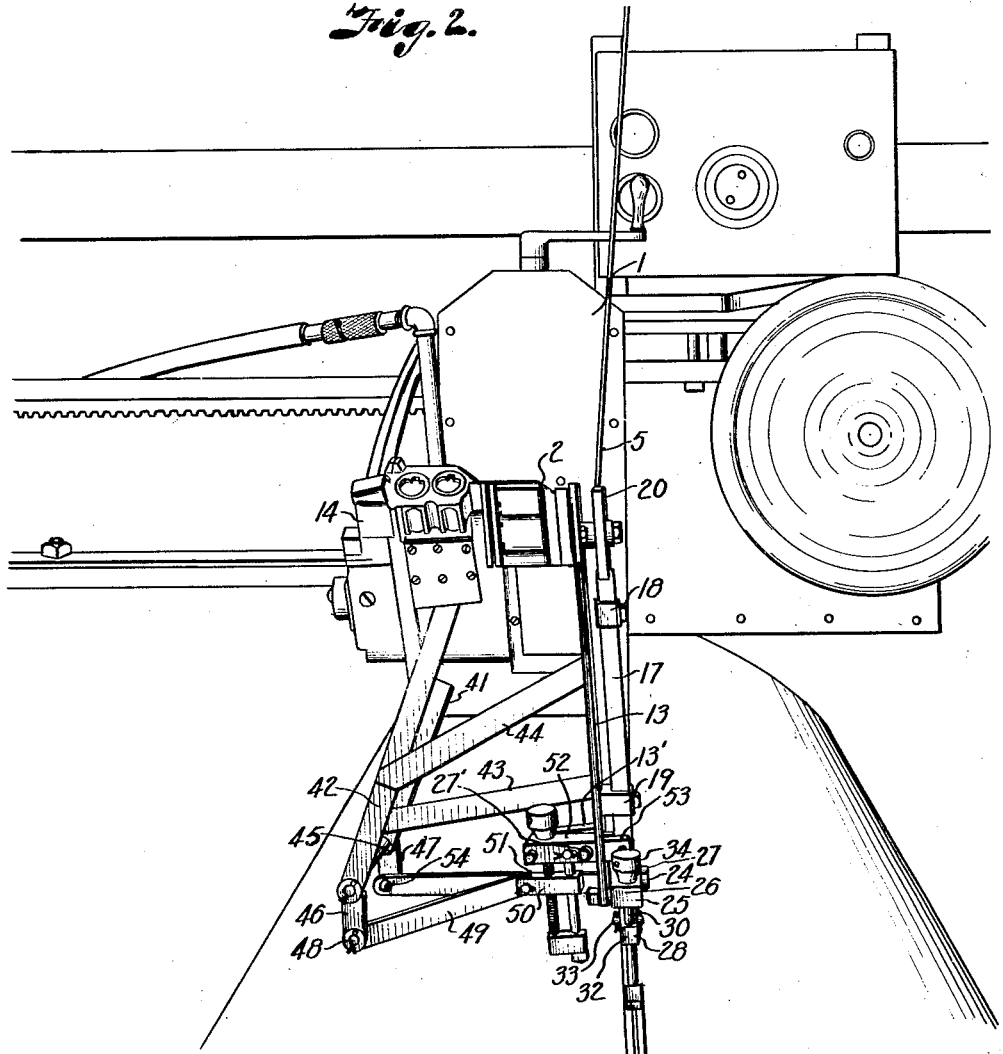
Fig. 2 is a perspective view of the side of the apparatus illustrated in Fig. 1.

The fan-shaped cam, as illustrated in Fig. 9, produces a substantially rectilinear curve. The electrode holder will swing sharply to one side of its stroke at which side it will dwell for a time proportionate to the relative forward movement of the electrode. It will then swing sharply to the opposite side of the curve and dwell for a like time. The dwell at the ends of the oscillations does, of course, depend upon the shape of the cam, as well as the forward progress of the welding wire, and the distances between each oscillation may be varied to suit the character of the weld desired.

Any intermediate form of curve between the rectilinear curve and the sine curve can be obtained by modifying the form of cam between a circle and the special shape shown in Fig. 9.

Figure 8:
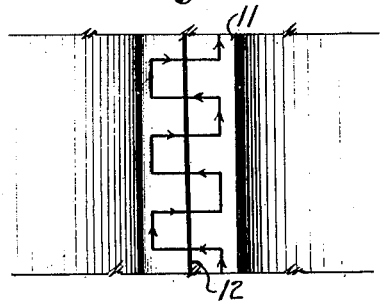
Fig. 8 shows a modified form of weld diagrammatically illustrating a diversified path for the electrode holder wherein the electrode holder dwells for a time interval at the sides of the weld.

In Fig. 8 is illustrated a type of weld wherein the oscillations are produced by the cam illustrated in Fig. 9 to distribute the welding metal at right angles across the seam and along the side edges thereof due to dwell periods of the electrode and forward movement of the welding head. The dwell periods at the sides of the seams are particularly desirable as it is necessary for the heat to be directed a major portion of the time against each side wall in order that the walls may be heated and melted down to fuse with the molten metal of the welding wire.

Figure 11:
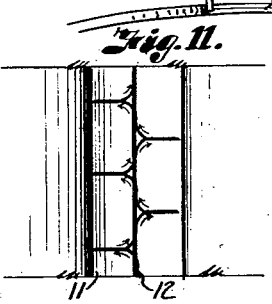
Fig. 11 is a further modified form of weld.
Figure 12:
Fig. 12 is a perspective view of the cam for effecting oscillation of the electrode holder as illustrated in Fig. 11.

In Fig. 11 is illustrated a weld that may be effected by the oscillations produced by a bar-shaped cam as is illustrated in Fig. 12.

It is apparent that cams of other shapes may be provided and that the length and frequency of the oscillations may be changed so that various movements of electrode wire may be effected to suit the character of the seam being welded.

In operating a welding apparatus equipped with an oscillating mechanism constructed in accordance with my invention, and assuming that a pressure tank is being welded having longitudinal and roundabout or transverse seams, a cam having the proper shape to produce the desired oscillations is applied to the motor shaft. To weld the roundabout seams the bell crank lever 25 is connected to the reciprocating rod 17 by inserting the pin 27 and locking the bell crank 51 by inserting the pin 27' through an opening 51' therein and into an aligning opening in the bracket 13'. The speed of the air motor may then be regulated proportionate to the forward relative movement of the electrode rod with relation to the movement of the tank.

It may be here stated that in welding the roundabout seams, the welding head is retained in a fixed position and the tank is rotated on a suitable trunnion to carry the seam past the electrode wire.

The cam in its rotation reciprocates the rod which through the bell crank oscillates the electrode holder back and forth across the seam. The adjusting screw 31 may then be adjusted to obtain the proper length of the oscillations so that the electrode wire is fed from one edge of the seam to the other. The speed of the motor, with relation to the forward progress of the weld, governs the frequency of the oscillation or the pitch of the curve traced.

When it is desired to weld the longitudinal seams, the pin 27 is removed from the bell crank 25 and inserted through the opening 25' to lock the crank 25, and the pin 27' is inserted in the bell crank lever 51 and through the rod so that the reciprocating rod, instead of actuating the bell crank 25, operates the bell crank 51, to rock the shaft 45, thereby effecting oscillation of the electrode holder through the connecting link 47, after which the adjusting screw on the bell crank 51 may be adjusted to obtain the proper length of oscillations to cover the width of the longitudinal seam. The air motor can be adjusted to effect the proper frequency of the oscillations as described in the welding of the circumferential seams.

It is obvious that an oscillating mechanism constructed and assembled as described may be quickly and easily adjusted to change from a longitudinal to a circumferential or transverse seam or vice-versa, and that the character of the oscillations may be changed by substituting different shaped cams on the motor shaft. It is also obvious that the length of the oscillations may be readily adjusted while the machine is in operation.

It is also important that the entire oscillating mechanism is mounted directly on the welding head and therefore does not in any way interfere with the adjustment of the head, either up or down, or the swiveling of the head to position the electrode wire at the proper angle with relation to the work and to center the path of oscillations with the seam, nor do any of the head adjustments affect the character of the oscillations.

What I claim and desire to secure by Letters Patent is:

1. In combination with a welding head for welding both the longitudinal and transverse seams of a positioned work piece, an electrode carried by the welding head, means associated with the welding head for effecting oscillation of the electrode in a plane transversely of the longitudinal seam when said longitudinal seam is being welded, means for effecting oscillation of the electrode in a plane transversely of the transverse seam when the transverse seam is being welded, and means for selectively rendering either of said means effective for the seam being welded.

2. In a welding apparatus including an electrode holder, means for oscillating the electrode holder including an actuating member, a bell crank lever arranged for operation by the actuating member, a second bell crank lever arranged for operation by the actuating member in a direction at an angle to the first named bell crank lever, and means connecting the electrode holder with the bell cranks and the bell cranks to said actuating member whereby said holder is selectively operated by either one of said bell crank levers.

3. In a welding apparatus including an electrode holder, means for oscillating the electrode holder including a reciprocatory member, a bell crank lever arranged for operation by the reciprocatory member, a second bell crank lever arranged for operation by the reciprocatory member in a direction at an angle to the first named bell crank lever, means connecting the electrode holder with the bell cranks, and means selectively connecting the bell cranks to said reciprocatory member whereby said holder is selectively operated by either one of said bell crank levers.

4. In a welding apparatus including an electrode holder, and a welding electrode carried by the holder, means for oscillating the holder including an actuating member, a bell crank arranged for operation by the actuating member, a second bell crank arranged for operation by the actuating member in a direction at an angle to the first bell crank, a link pivotally connecting each bell crank with the electrode holder, means for adjusting the pivotal connections of the links with the bell cranks, and means selectively connecting the respective bell cranks to selectively oscillate said holder in one of two directions.

5. In a welding apparatus including a welding electrode, means for oscillating the welding electrode including a cam member, a reciprocatory member actuated by the cam member, a bell crank lever arranged for operation by the reciprocatory member, a second bell crank lever arranged for operation by the reciprocatory member in a direction at an angle to the first named bell crank lever, means connecting the electrode holder with the bell cranks and means selectively connecting the bell cranks to said reciprocatory member whereby said holder is selectively operated by either one of said bell crank levers.

6. In a welding apparatus including an electrode holder, and a welding electrode carried by the holder, means for oscillating the holder including a cam member, a reciprocatory bar actuated by the cam member, a bell crank lever arranged for operation by the bar, a second bell crank lever arranged for operation by the bar in a direction at an angle to the first bell crank lever, means connecting the electrode holder with the bell cranks, means selectively connecting the bell cranks to the bar whereby said holder is selectively operated by either one of said bell crank levers, and means for adjusting the bell crank levers to vary length of the oscillations.

7. In a welding apparatus including an electrode holder, and a welding electrode carried by the holder, means for oscillating the holder including a cam member, a reciprocatory bar actuated by the cam member, a bell crank lever arranged for operation by the bar, a second bell crank lever arranged for operation by the bar in a direction at an angle to the first bell crank lever, a link pivotally connecting each bell crank lever with the electrode holder, means for adjusting the pivotal connections of the links with the bell crank levers, and means selectively connecting the bell cranks with the electrode holder to selectively oscillate said holder in one of two directions.

8. In a welding apparatus including an electrode holder, and a welding electrode carried by the holder, means for oscillating the holder including a cam member, a reciprocatory bar actuated by the cam member, a bell crank lever arranged for operation by the bar, a link connecting the bell crank lever with the electrode holder, a second bell crank level arranged for operation by said bar at an angle to the first named bell crank lever, a rock shaft, a link connecting the last named bell crank with the rock shaft, means operably connecting the rock shaft with the electrode holder, and means selectively connecting the bell cranks to effect oscillation of said holder through either one of said bell cranks.

9. In a welding apparatus including an electrode holder, and a welding electrode carried by the holder, means for oscillating the holder including a cam member, a reciprocatory bar actuated by the cam member, a bell crank lever arranged for operation by the bar, a link connecting the bell crank lever with the electrode holder, a second bell crank lever arranged for operation by said bar in a direction at an angle to the first bell crank lever, a rock shaft, a link connecting the last named bell crank with the rock shaft, means connecting the rock shaft with the electrode holder, means selectively connecting the bell cranks with the reciprocatory bar to effect oscillation of said holder by either bell crank, and means for adjusting said link connections with the bell cranks to vary the length of said oscillations.

10. In combination with a welding head including an electrode holder and a welding electrode carried by the holder, a support carried by the head, a motor on the support, a cam operable by the motor, a reciprocatory member carried by the support, a cam track on said member, means operably connecting the reciprocatory member with the electrode holder for oscillating the electrode holder in one plane, a second means adapted to be actuated by the reciprocatory member for oscillating the electrode holder in a plane at an angle to the first plane, and means for selectively connecting either of said means with the reciprocating member to oscillate the welding electrode in either of said planes.

11. In a welding apparatus including a welding electrode, means for oscillating the welding electrode including an actuating member, a bell crank lever arranged for operation by the actuating member, a second bell crank lever arranged for operation by the actuating member in a direction at an angle to the first named bell crank lever, means connecting the electrode holder with the bell cranks and the bell cranks to said actuating member whereby said holder is selectively operated by either one of said bell crank levers, and means for locking one bell crank against movement while the electrode is being oscillated through the other bell crank.

12. In a welding apparatus including a welding electrode, means for oscillating the welding electrode including a cam member, a reciprocatory member actuated by the cam member, a bell crank lever arranged for operation by said reciprocatory member, a second bell crank lever arranged for operation by the reciprocatory member in a direction at an angle to the first named bell crank lever, means connecting the electrode holder with the bell cranks to oscillate said holder, means selectively connecting the bell cranks to said reciprocatory member, and means for locking the other of said bell cranks while the selected bell crank is connected to the reciprocatory member.

13. In a welding apparatus including an electrode holder, and a welding electrode carried by the holder, means for oscillating the holder including a cam member, a reciprocatory member actuated by the cam member, a bell crank lever arranged for actuation by the reciprocatory member, a second bell crank lever arranged for actuation by the reciprocatory member at an angle to the first bell crank lever, means connecting the electrode holder with the bell cranks, means selectively connecting the bell cranks to the reciprocatory member to oscillate said holder, means for adjusting the bell crank levers to vary length of the oscillations, and means for selectively locking the bell cranks.

GWYNNE RAYMOND.